United States Patent [19]
Newinger

[11] 3,783,855
[45] Jan. 8, 1974

[54] HEATING DEVICE

[76] Inventor: Vann O. Newinger, 452 Holly St., Laguna Beach, Calif.

[22] Filed: Aug. 25, 1972

[21] Appl. No.: 284,010

[52] U.S. Cl. .................................... 126/25 R
[51] Int. Cl. .................................... A47j 37/07
[58] Field of Search ............ 126/25 A, 25 R, 25 AA, 126/9 R, 9 B, 25 B

[56] References Cited
UNITED STATES PATENTS

| | | | |
|---|---|---|---|
| 3,182,585 | 5/1965 | Rensch et al. ............... | 126/25 R X |
| 2,717,137 | 12/1973 | Moline ............................. | 126/25 B |
| 2,709,996 | 6/1955 | Tescula ............................ | 126/25 R |

*Primary Examiner*—William F. O'Dea
*Assistant Examiner*—Harold Joyce
*Attorney*—Nienow & Frater

[57] ABSTRACT

The functions of barbecue cooker, fry plate, and space heater are combined in a single unit consisting of a tray on which a fire box is pivotally mounted. The fire box is formed with a grate at one surface, and a solid wall at an opposite surface and it can be tilted so that either of those surfaces lies substantially horizontally for use in barbecuing or frying. The fire box can also be mounted vertically so that heat escapes through its grate in a horizontal direction to form the space heating function. The tray serves as an ash collector, as a support for the fire box in its several positions, and as a means by which the fire box is made portable without need to extinguish its burning fuel.

5 Claims, 6 Drawing Figures

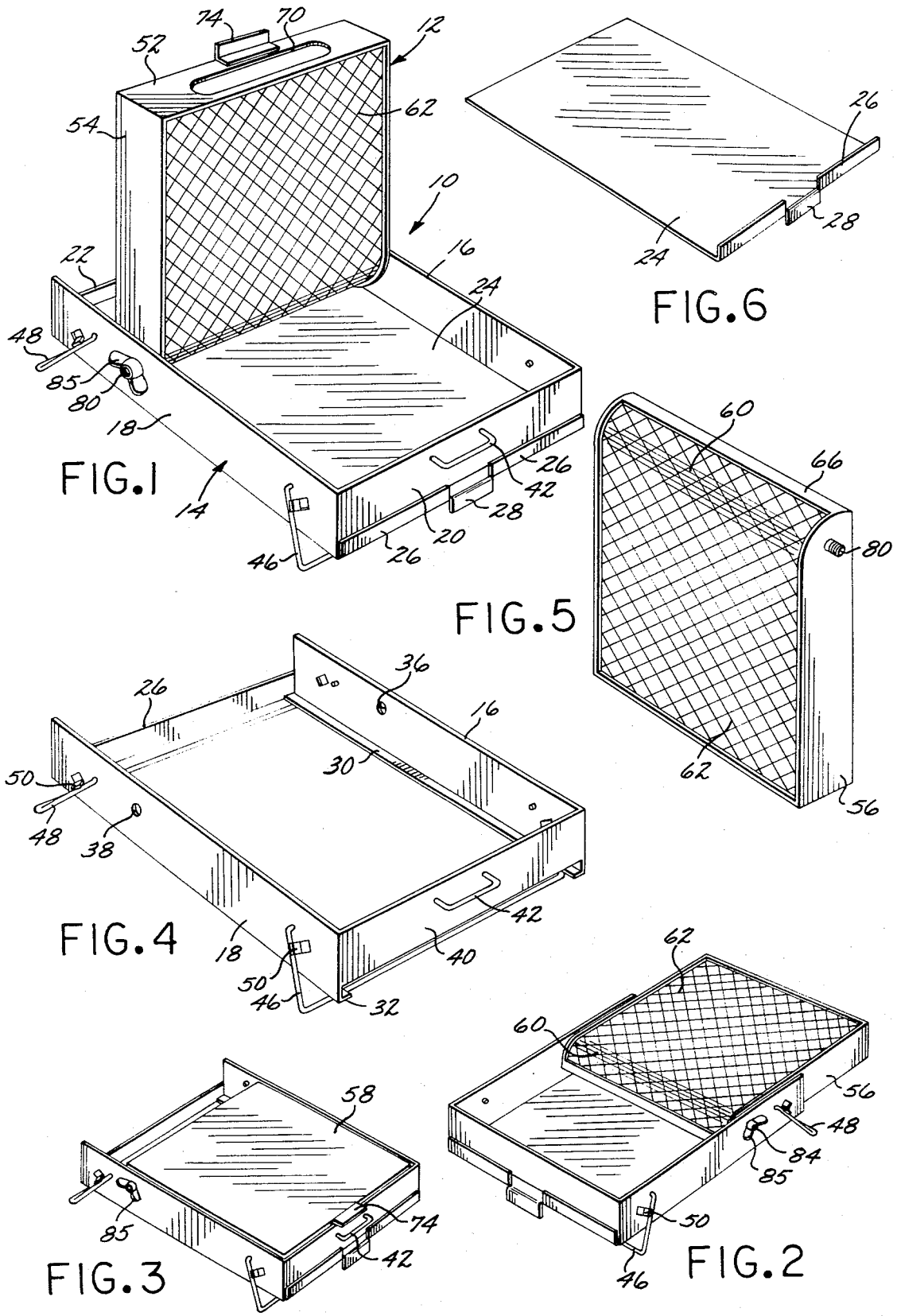

HEATING DEVICE

This invention relates to improvements in heating devices and while not limited thereto, it relates particularly to heating units of the kind that can burn charcoal, coal briquettes and other fuels that are customarily employed in outdoor barbecuing.

In many areas, particularly in the southwestern portion of the United States, climate and afternoon and early evening temperatures make outdoor barbecuing a pleasant experience over much of the year. In those areas, evening temperatures often drop quite rapidly to uncomfortable values long before the fuel of the barbecue has burned away. But the barbecue structures available in the past do not serve well as space heaters. Once the cooking task is complete their heat is wasted and some other means is needed to dispel the night chill.

It is an object of the invention to change that situation. It is an object to provide a structure which can serve either as a cooking unit or as a space heater. Rather than a unit that performs those tasks simultaneously and makes cooking a hot task, the invention provides a unit which is either a space heater or a cooking unit and which can be converted from one use to the other at will. The invention provides a heating unit which is arranged so that its heat is transmitted laterally by radiation when it is to be used as a space heater and whose heat is transferred vertically by radiation and convection or by conduction when it is to be used as a cooking unit.

These objects are realized in the invention by the provision of a fire box which has one surface formed as a grate and which is arranged so that that surface is held generally vertical when the unit is to serve as a space heater and so that it is held generally horizontal when the unit is to serve as a cooking device. The fire box is mounted in a manner that permits its being rotated after its fuel is ignited and is burning and which makes the unit portable so that it can be moved from a place where it performs one task to a place where it performs another task without need to extinguish the fuel.

A main feature of the structure is the provision of a fire box from which heat escapes by radiation and whose position can be changed so that radiation proceeds horizontally or vertically. It is constructed so that the fuel can burn in either fire box position, so that ashes are easily collected and disposed of, so that those ashes present no hindrance to efficient operation of the heater, and so that the heater can be moved from one location to another while its fuel is burning and it is hot. To provide an apparatus which can perform all of those functions and which is rugged and reliable in operation and relatively inexpensive to produce, is another of the objects of the invention.

These and other objects and advantages of the invention which will hereinafter appear are realized in part by the provision of a heating unit that includes a tray having side walls and a bottom wall; a fire box which fits within that tray and has front and rear faces and side walls and an upper and lower wall and whose forward wall has the form of a grate; and a means for mounting the fire box on the walls of the tray so that the box can be pivoted from a position in which the grate stands uprightly to a position in which the grate faces upwardly and, in the preferred form, to a position in which the grate faces downwardly overlying the bottom of the tray.

In the drawings:

FIG. 1 is a pictorial view of a heater embodying the invention; its fire box is shown in the vertical, space heating position;

FIGS. 2 and 3 are pictorial views of the heater of FIG. 1 shown with its fire box in barbecuing and frying positions, respectively;

FIG. 4 is a pictorial view of the tray portion of the heater with its bottom wall removed;

FIG. 5 is a pictorial view of the fire box portion of the unit shown with its lower end up; and FIG. 6 is a pictorial view of the removable bottom wall of the tray shown in FIG. 4.

Referring to FIG. 1, the heater unit 10 comprises a fire box 12 and a tray 14. The tray is generally rectangular in form. It has two side walls 16 and 18, a forward wall 20 and a rear wall 22. The bottom wall 24 is removable and is best seen in FIG. 6 where it is shown to have an upwardly extending front lip 26 which is divided into left and right segments by a portion of that lip 28 which is bent downwardly to form a handle. The lip 28 extends below the bottom wall 24 and facilitates removal of the tray.

The tray, with its bottom 24 removed, is shown in FIG. 4. The lower edges of walls 16, 18 and 22 are bent inwardly to form supports for the bottom wall 24. Thus, the lower portion of wall 16 is bent inwardly so that the wall is L-shaped in cross-section and the lower leg 30 serves as a support for the bottom piece 24. Similarly, the lower portion 32 of wall 18 is bent inwardly to serve as a support or rail for the other edge of the bottom piece 24. Finally, the lower portion of rear wall 26 is bent inwardly to form a support 34 across the back of the tray which together with wall 26 serves to make the tray rigid.

Wall 26 is less high than the wall 16 and 18. That feature is not essential, however. More importantly wall 26 is less high than the distance from the supports 30 and 32 to the two pivot openings 36 and 38 that are formed in wall 16 and 18, respectively. The fire box is provided with sidewardly extending pins which fit in those openings so that the fire box can be rotated about the pins. In one position of the fire box it extends rearwardly so that part of it extends beyond the limits of side walls 16 and 18 to the rear of the tray. It is held there in substantially horizontal position, in a position in which it lies substantially parallel with the bottom wall 24 by the upper edge of rear wall 26 serving as a stop.

The forward wall 40 of the tray is less wide than walls 16 and 18 are high. In this case the upper edge of the wall is flush with the upper edge of walls 16 and 18 so that a space remains below the lower edge of the wall 40 into which the bottom wall section 24 may be inserted and through which it may be removed notwithstanding that it is covered with ashes. The forward lip 26 of the bottom wall serves to close that opening except at the handle 28 to minimize the possibility that the ashes will be lost through that front opening without removal of the bottom wall.

A handle 42 is fixed to the front wall 40 and extends forwardly from its central region. A bale handle is employed both so that it will remain relatively cool and so that the fingers of a hand can be wrapped around it in a manner that permits simultaneous holding of a cooperating handle of the fire box with the thumb of the same hand.

While not essential, the preferred form of the invention is provided with legs of a kind that permit holding the tray at a substantial distance above the surface on which it rests. In this embodiment, two bales 46 and 48 are pivotally mounted on the side walls of the tray so that they can be swung inwardly flush with the tray bottom or swung outwardly against stops to the position shown. In this embodiment the stops are formed by lancing the side walls and bending out tabs. The several tabs have been designated 50 for identification.

The fire box is generally rectangular. It comprises an upper wall 52, side walls 54 and 56, a rear wall 58, best shown in FIG. 3, a bottom wall 60 and a forward wall 62. The forward wall is provided with through openings over its entire surface. In this preferred embodiment the forward wall is formed as a grate made of heavy wire mesh. That mesh continues over the forward lower edge of the fire box so that the lower wall, or at least a part of the lower wall, is also formed of heavy wire mesh which serves as a continuation of the grate. In the embodiment shown, part 66 of the lower wall is solid. The remaining portion is made of wire mesh and the curve at the transition from bottom wall to front wall is formed as a segment of a circle, in cross-section, so that the point at which the front wall ends and the bottom wall begins is not well defined. Nonetheless, the construction is such that when the fire box is held vertically, as it is shown to be in FIG. 1, a part of the grate underlies the fire box so that air may enter from below and proceed upwardly through fuel contained in the box. Fuel is placed in the box through the upper opening 70. That opening is generally centered in the upper wall and does not extend to any of the edges. Thus constructed, it needs no cover because fuel will not spill out whether the fire box has the position shown in FIG. 1 or one of the positions shown in FIGS. 2 and 3. The fire box is fitted with a handle 74 which extends upwardly from the fire box at or near the plane of the rear wall of the fire box. In this embodiment, the handle comprises a short section of angle iron fixed to the upper wall 52. It is important that the handle 74 lie in juxtaposition to the handles 42 when the fire box is pivoted forwardly to the position it is shown to have in FIG. 3. Thus arranged, the fire box can be held in position by the thumb of the hand that grasps the handle 42 making it convenient to move the unit even though the fire box is filled with hot coals.

When the fire box is assembled with the tray, pin 80 of the fire box extends within the hole 38 of the tray. The other pin 84 extends through hole 36. The pin and the hole are located so that the distance from the pin to the top wall 52 of the fire box is less than the distance from the pivot holes 36 and 38 to the forward wall 40 of the tray. Because of that, the fire box can be rotated forwardly so that it fits entirely within the tray as shown in FIG. 3 with its grate facing downwardly toward the bottom wall 24. The handle 74 is sufficiently long so that it extends past the wall 40 of the tray and rests upon it. Thus, the handle serves the function of holding the fire box with its rear wall 58 level. The thickness dimension of the fire box is such that its grate 62 does not touch the bottom wall 24 of the tray. A space for air flow remains between them so that air may reach the fuel inside the box. Thus arranged, the rear wall 58 can serve as a surface for heating or frying foods.

The distance from the pivot pins of the fire box to the upper wall 52 of the box is greater than the distance from pivot holes 36 and 38 to the rear wall 26 of the tray. Consequently, when the fire box is rotated rearwardly so that its grate 62 faces upwardly as shown in FIG. 2, the rear wall of the fire box comes to rest on the upper edge of wall 26 of the tray whereby the grate 62 is held in a horizontal position permitting its use as a barbecue surface.

The fire box is relatively thin. Chunks or briquettes of fuel are confined to one or two layers and thus are well distributed over a substantial area even when the fire box is positioned vertically as shown in FIG. 1. If, as in the case of briquettes, the ash tends to adhere to or remain with the burning fuel, simply rotating the fire box so its grate faces down will clear the fire box of ash and insure efficient operation as a radiating space heater.

Although I have shown and described certain specific embodiments of my invention, I am fully aware that many modifications thereof are possible. My invention, therefore, is not to be restricted except insofar as is necessitated by the prior art.

I claim:
1. A heating unit comprising in combination:
a tray having side walls and a bottom wall;
a fire box having front and rear faces, side walls and upper and lower walls, the forward wall comprising a grate;
pivoting means in the form of an interconnection between the fire box and tray for permitting movement of the fire box relative to the tray between positions in which the grate faces downwardly overlying the bottom wall of the tray, in which the grate is substantially vertical, and in which the grate faces upwardly;
the fire box and tray being generally rectangular in form and the upper wall of said fire box being formed with a fuel opening;
said grate comprising part of said lower wall;
said interconnection comprising a pivotal connection between the side walls of the tray and the side walls of the fire box adjacent the lower wall of the fire box;
said tray comprising a forward wall and a rear wall, and said pivotal connection being made to the side walls of the tray at a point closer to the rear wall than to the forward wall;
the distance from the pivotal connection to the upper wall of the fire box being less than the distance from said pivotal connection to the forward wall of the tray and being greater than the distance from said pivotal connection to the rear wall of said tray;
the rear wall of the tray being less high than the height of said pivotal connection above the bottom of the tray;
the front wall of the tray being fixed to the side walls of the tray and having its lower edge above the bottom of the tray, and the bottom of the tray being removable toward the front of said tray.

2. The invention defined in claim 1 which further comprises collapsible legs mounted upon said tray.

3. A heating unit comprising, in combination:
a tray having side walls and a bottom wall;

a fire box having front and rear faces, side walls and upper and lower walls, the forward wall comprising a grate;

pivoting means in the form of an interconnection between the fire box and tray for permitting movement of the fire box relative to the tray between positions in which the grate faces downwardly overlying the bottom wall of the tray, in which the grate is substantially vertical, and in which the grate faces upwardly;

the fire box and tray being generally rectangular in form and the upper wall of said fire box being formed with a fuel opening;

said grate comprising part of said lower wall;

the grate being curved at the transition from the forward wall of the cylinder whereby at least part of the lower wall is formed by the grate.

4. A heating unit comprising, in combination:

a tray having side walls and a bottom wall;

a fire box having front and rear faces, side walls and upper and lower walls, the forward wall comprising a grate;

pivoting means in the form of an interconnection between the fire box and tray for permitting movement of the fire box relative to the tray between positions in which the grate faces downwardly overlying the bottom wall of the tray, in which the grate is substantially vertical, and in which the grate faces upwardly;

the fire box and tray being generally rectangular in form and the upper wall of said fire box being formed with a fuel opening;

said grate comprising part of said lower wall;

said interconnection comprising a pivotal connection between the side walls of the tray and the side walls of the fire box adjacent the lower wall of the fire box;

said fire box being provided with a handle extending beyond its upper wall sufficiently to rest upon the forward wall of said tray when the fire box is rotated so that its forward side faces the bottom of the tray.

5. The invention defined in claim 4 which further comprises a handle fixed to the tray and extending from its forward end to juxtaposition with the handle of the fire box when the fire box is so rotated.

* * * * *